(12) United States Patent
Tu et al.

(10) Patent No.: US 7,685,291 B2
(45) Date of Patent: Mar. 23, 2010

(54) MESSAGING SERVICE INTEROPERABILITY METHODS AND RELATED DEVICES

(75) Inventors: Kuan Hua Tu, Yongkang (TW); Jyh-Chun Wang, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 1170 days.

(21) Appl. No.: 11/268,934

(22) Filed: Nov. 8, 2005

(65) Prior Publication Data
US 2007/0106806 A1 May 10, 2007

(51) Int. Cl.
*G06F 15/16* (2006.01)

(52) U.S. Cl. ............... 709/227; 370/349; 455/450; 455/466; 707/201; 707/203; 709/201; 709/203; 709/224; 709/246; 709/248; 714/748; 714/776; 717/168

(58) Field of Classification Search ............... 709/227
See application file for complete search history.

(56) References Cited

U.S. PATENT DOCUMENTS

| | | | | |
|---|---|---|---|---|
| 5,966,663 | A * | 10/1999 | Gleason ............... | 455/466 |
| 6,192,377 | B1 * | 2/2001 | Ganesh et al. ........ | 707/203 |
| 6,510,439 | B1 * | 1/2003 | Rangarajan et al. .... | 707/201 |
| 6,557,012 | B1 * | 4/2003 | Arun et al. ............ | 707/203 |
| 6,754,717 | B1 * | 6/2004 | Day et al. ............. | 709/248 |
| 7,131,122 | B1 * | 10/2006 | Lakhdhir ............. | 717/168 |
| 7,249,303 | B2 * | 7/2007 | Dottling et al. ........ | 714/748 |
| 2002/0048329 | A1 * | 4/2002 | Tran et al. ............ | 375/340 |
| 2003/0174662 | A1 * | 9/2003 | Malkamaki ........... | 370/310 |
| 2004/0044774 | A1 * | 3/2004 | Mangalik et al. ....... | 709/227 |
| 2004/0068584 | A1 * | 4/2004 | Costa-Requena et al. | 709/246 |
| 2005/0073987 | A1 * | 4/2005 | Wu ..................... | 370/349 |
| 2006/0046733 | A1 * | 3/2006 | Fauconnier et al. .... | 455/450 |
| 2006/0064625 | A1 * | 3/2006 | Klein et al. ........... | 714/776 |
| 2006/0200547 | A1 * | 9/2006 | Edwards et al. ........ | 709/224 |
| 2007/0005335 | A1 * | 1/2007 | Almstrom ............. | 703/27 |
| 2007/0067357 | A1 * | 3/2007 | Clark .................. | 707/203 |
| 2007/0189712 | A1 * | 8/2007 | Hirayama et al. ....... | 386/83 |
| 2008/0089314 | A1 * | 4/2008 | Meyer et al. .......... | 370/349 |

FOREIGN PATENT DOCUMENTS

| | | |
|---|---|---|
| CN | 1595860 A | 3/2005 |
| CN | 1620059 A | 5/2005 |

OTHER PUBLICATIONS

"WV-042 Client-Server Protocol Session Transactions, Version 1.2" Open Mobile Alliance, 2003, Feb. 9, 2009.
China Office Action mailed Apr. 3, 2009.
English language Abstract of CN 1595860A (published Mar. 16, 2005).
English language Abstract of CN 1620059A (published May 25, 2005).

* cited by examiner

*Primary Examiner*—Firmin Backer
*Assistant Examiner*—Tobias J Casaw
(74) *Attorney, Agent, or Firm*—Thomas, Kayden, Horstemeyer & Risley

(57) ABSTRACT

Messaging service interoperability methods. A client implements a messaging service version (X.Y), in which X is a major version number and Y is a minor version number. The client sends a PDU (Protocol Data Unit) with version (X.Y) to a server. If the PDU with version (X.Y) is not accepted by the server, the client reselects a messaging service version (Z.H), and sends a PDU with the reselected version (Z.H) to the server. Reselection of the messaging service version and sending of a PDU with the reselected version are repeated until the PDU is accepted by the server or all possible reselected versions have been selected.

28 Claims, 6 Drawing Sheets

| PLMN | IMSI | LAI | RAI |
|---|---|---|---|
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

FIG. 3

| Sercer Identification | Messaging Service Version | Last_check_time |
|---|---|---|
| #1 | 1.1 | 9/10 |
| #2 | 1.0 | 8/15 |
| ⋮ | ⋮ | ⋮ |

MESSAGING SERVICE INTEROPERABILITY METHODS AND RELATED DEVICES

BACKGROUND

The present disclosure relates generally to interoperability between entities with different messaging service versions, and more particularly to messaging service interoperability methods that dynamically switch messaging service versions.

Messaging services such as MMS (Multimedia Messaging Service) have become a popular application in mobile devices such as mobile phones. As messaging service expands, the OMA (Open Mobile Alliance) continues update of specifications for messaging service. The protocol version is represented by a version number which is divided into a major version number and a minor version number. Currently, OMA has already released MMS versions 1.0, 1.1, 1.2, 1.3, and 2.0. OMA defines rules to provide interoperability between MMS entities, such as MMS servers (proxy-relays) and MMS clients, with different MMS versions. MMS versions with only minor version number differences provide full backward compatibility. For example, a MMS server with MMS version 1.1 accepts a PDU (Protocol Data Unit) of MMS version 1.0 transmitted from a MMS client. MMS versions with major version number differences do not provide full backward compatibility. For example, a MMS server with MMS version 2.0 rejects a PDU of MMS version 1.0 transmitted from a MMS client. Additionally, all MMS versions support the MMS 1.0 M-Send.conf PDU and MMS 1.0 M-NotifyResp.ind PDU, in which the M-Send.conf PDU and M-Notify-Resp.ind PDU are two types of PDUs under MMS version 1.0.

If a MMS server (proxy-relay) and a MMS client implement MMS versions with the same major version number and different minor version numbers, the MMS server or client receiving a PDU determines whether the message type of the PDU is supportable. If the PDU is not supported, the MMS server responds a M-Send.conf PDU containing a response status-value "Error-unsupported-message" to the client. If the PDU is not supported, the MMS client responds a M-Notify-Resp.ind PDU containing a status-value "Unrecognized" to the server. If the MMS server supports the PDU, it ignores all unrecognized fields and recognized fields with unrecognized values, in which an unrecognized value is not defined in a corresponding specification of a field. If the MMS client supports the PDU, it ignores all unrecognized fields and recognized fields with unrecognized values.

If a MMS server and a MMS client implement MMS versions with different major version numbers, the MMS client receiving a PDU from the server responds a M-NotifyResp.ind PDU containing a status-value "Unrecognized" to the server. In OMA specification, the MMS server can selectively support the MMS with different major version numbers. However, the MMS server receiving a PDU from the client always responds a M-Send.conf PDU containing a response status-value "Error-unsupported-message" to the client if the MMS server and the MMS client implement MMS versions with different major version numbers.

According to the interoperability rules defined by OMA, for example, when a MMS version 1.0 server receives one MMS version 1.1 message from a MMS client, it has to parse every recognized header fields rather than returning a M-Send.conf PDU containing a response status-value "Error-unsupported-message". However, some MMS servers immediately return a M-Send.conf PDU containing a response status-value "Error-unsupported-message" upon receiving a PDU with the same major version number and different minor version numbers. To be compatible with these MMS servers, MMS clients have to downgrade their MMS minor version. For example, a MMS version must be downgraded from 1.1 to 1.0, losing features of the newer MMS version even though some MMS servers are compatible therewith.

SUMMARY

Messaging service interoperability methods and related devices are provided.

In an embodiment of a messaging service interoperability method, a client implements a messaging service version (X.Y), in which X is a major version number and Y is a minor version number. The client sends a PDU with version (X.Y) to a server. If the PDU with version (X.Y) is not accepted by the server, the client reselects a messaging service version (Z.H), and sends a PDU with the reselected version (Z.H) to the server. Reselection of the messaging service version and sending of a PDU with the reselected version are repeated until the PDU is accepted by the server or all possible reselected versions have been selected.

In an embodiment of a messaging service interoperability method, a client implements a messaging service version (X.Y), in which X is a major version number and Y is a minor version number. The client sends a PDU with version (X.Y) to a server. If the PDU with version (X.Y) is not accepted by the server, the client sends a version discovery request with all versions supported by the client to the server, and determines whether a version list is received from the server. If so, a version in the version list is used as the messaging service version of the client.

Messaging service interoperability methods may take the form of program code embodied in tangible media. When the program code is loaded into and executed by a machine, the machine becomes an apparatus for practicing the disclosed method.

DESCRIPTION OF THE DRAWINGS

The invention will become more fully understood by referring to the following detailed description with reference to the accompanying drawings, wherein:

FIG. 3 shows a combination of server identification;

FIG. 4 shows an example of a mapping table;

DESCRIPTION

Messaging service interoperability methods and related devices are provided.

Figure 1:
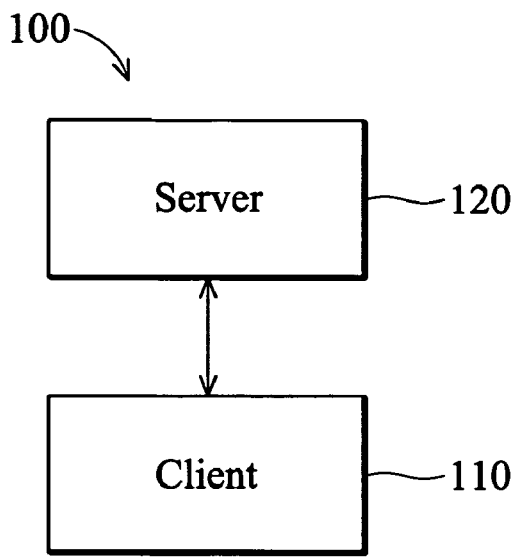
FIG. 1 is a schematic diagram illustrating an embodiment of a messaging service system.

FIG. 1 is a schematic diagram illustrating an embodiment of a messaging service system.

The messaging service system 100 comprises a client 110 and a server 120 (proxy-relay), sending and receiving PDUs/messages and using a messaging service therebetween. The messaging service comprises MMS and IMPS (Instant Messaging and Presence Service). The client 110 comprises a mobile device such as mobile phone. The client 110 and server 120 respectively implement a messaging service version. Similarly, the messaging service version is represented by a version number which is divided into a major version number and a minor version number. Additionally, the client 110 receives channel information from the server 120. The channel information comprises country and mobile network identification codes, channel description, BCCH (Broadcast Control Channel) list of a cell, and others. Any combination of PLMN (Public Land Mobile Network) number, LAI (Location Area Identifier), RAI (Routing Area Identifier), and IMSI (International Mobile Subscriber Identity) can act as server identification for identification of a specific server. FIG. 3 shows a combination of server identification, in which "1" means an item is used in the combination. The PLMN number, LAI, and RAI can be extracted from the channel information, and the IMSI is a unique identifier for a SIM card on the client.

Figure 2:
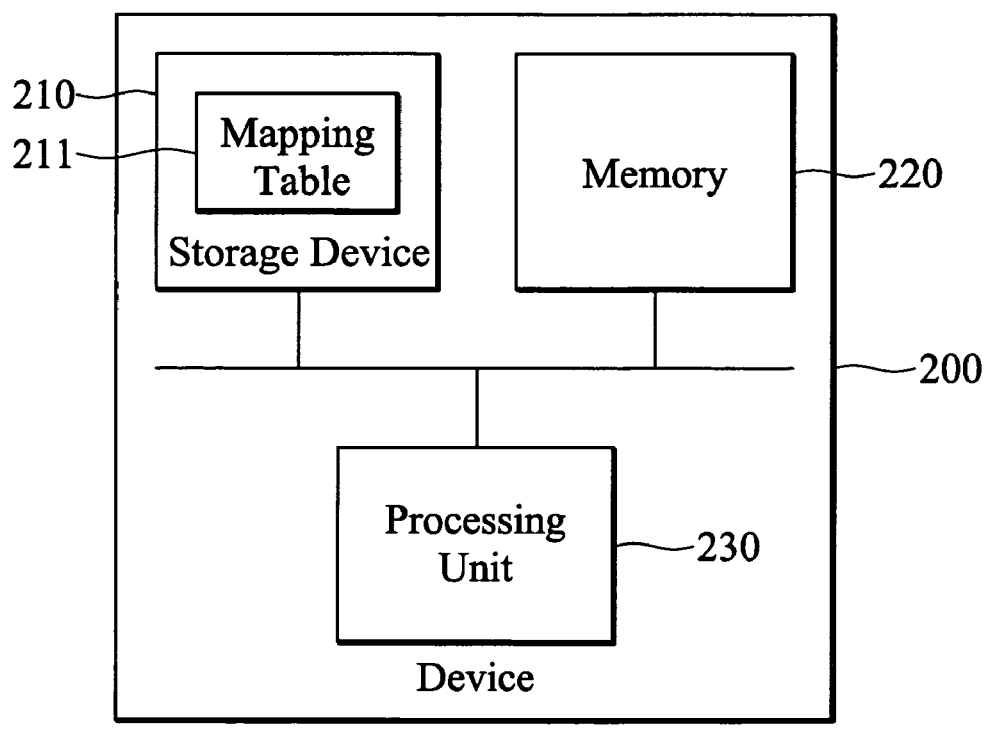
FIG. 2 is a schematic diagram illustrating an embodiment of a device.

FIG. 2 is a schematic diagram illustrating an embodiment of a device.

The client 110 comprises the device 200 comprising a storage device 210, a memory 220, and a processing unit 230. The storage device 210 comprises a mapping table 211 comprising a plurality of entries. Each entry comprises a first field recording server identification, a second field recording messaging service version implemented on the server, and a third field recording the last check date of the server (last-check-time). FIG. 4 shows an example of a mapping table. As shown in FIG. 4, the mapping table 211 comprises two entries, in which server #1 implements messaging service version 1.1, and the corresponding last check time is 9/10, and server #2 implements messaging service version 1.0, and the corresponding last check time is 8/15. Additionally, a freshness time (not shown) such as 30 days is set in the device 200, and is discussed later. In some embodiments, the mapping table 211 may be a file originally stored in the storage device 210, and loaded into the memory 220 after the device 200 is powered on. If the mapping table 211 is modified, the modified mapping table is updated to the storage device 210. Additionally, the number of entries in the mapping table 211 is limited. If no entry is available, an entry not accessed for a period can be used to store new information. The processing unit 230 performs the messaging service interoperability method of the invention and other operations.

Figure 5:
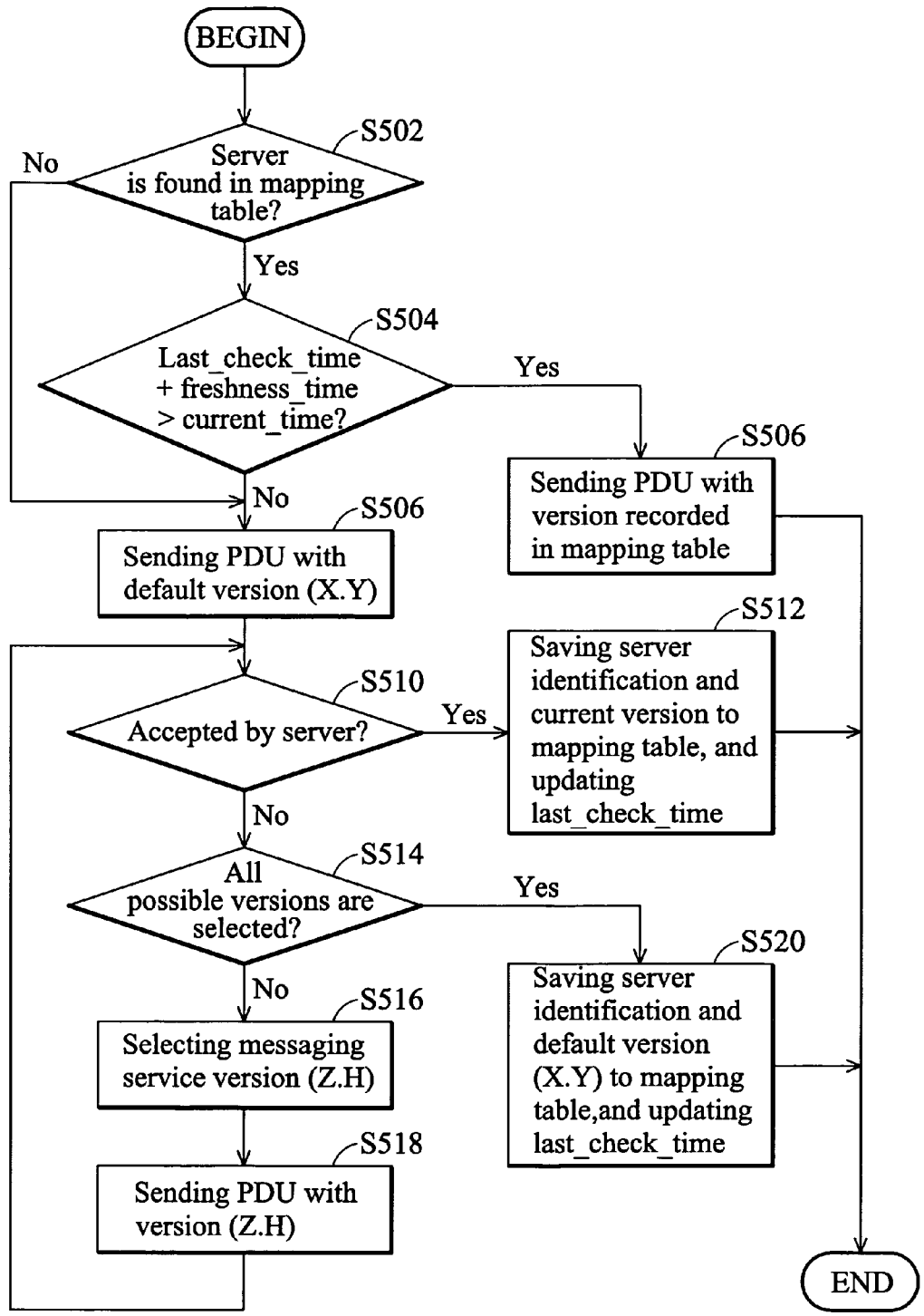
FIG. 5 is a flowchart of an embodiment of a messaging service interoperability method.

FIG. 5 is a flowchart of an embodiment of a messaging service interoperability method for use in a server, and a client implementing a messaging service version (X.Y).

In step S502, the client determines whether the server (server identification) is recorded in the mapping table. It is understood that the server identification can be obtained from the channel information received from the server or a communication network. If so, in step S504, it is determined whether the last check time corresponding to the server identification plus the freshness time exceeds a current time. If so, in step S506, the client sends a PDU with the corresponding messaging service version recorded in the mapping table to the server. If the server is not in the mapping table (No in step S502) or the last check time plus the freshness time does not exceed the current time, indicating that the recorded version has not been used or updated for a period (No in step S504), in step S508, the client sends a PDU with the default messaging service version (X.Y) to the server. In step S510, it is determined whether the PDU is accepted by the server. As described, if a server and a client implement messaging service versions of different major version numbers, the server responds a M-Send.conf PDU containing a response status-value "Error-unsupported-message" to the client. If a server and a client implement messaging service versions of the same major version number and different minor version numbers, the server directly responds a M-Send.conf PDU containing a response status-value "Error-unsupported-message" to the client, in practice. Thus, step S510 can be performed by determining whether a PDU containing "Error-unsupported-message" is received.

If the PDU is accepted by the server, in step S512, the server identification and the current version are saved to the mapping table, and the last check time is updated. It is understood that if the server identification is already in the mapping table, the current version is updated to the field of an entry corresponding to the server identification, and also the last check time is updated. If the PDU is not accepted by the server, in step S514, it is determined whether all possible versions have been selected. In some embodiments, a configurable version margin m can be set in the device, and a sequence of messaging service versions can be (X.0), ((X−1).0), (X+1).0), ((X−2).0), ((X+2).0), . . . , ((X−m).0), and ((X+m).0). If all messaging service versions in the sequence are selected, it means all possible versions have been selected. If not, in step S516, the client selects a messaging service version (Z.H), and in step S518, sends a PDU with the selected version (Z.H) to the server. The procedure returns to step S510. In some embodiments, the order of selected versions can follow the sequence. For example, (X.0) is for first selection, ((X−1).0) is for second selection, ((X+1).0) is for third selection, and the like. In the preferred embodiment, H=0, while (X−m)≦Z≦(X+m). However, in some embodiments, H can be any value as long as 0≦H≦Y. As mentioned, in the preferred embodiment, m=2.

Additionally, in some embodiments, each entry in the mapping table may further comprise a field "next_version" (not shown) recording a messaging service version for the next version selection. If the value in "next_version" is 0 (0.0), all possible versions have been selected. For example, when a client sends a PDU first time, if the PDU is not accepted by a server, the messaging service version becomes (X.Y), and the next version becomes (X.0). If the PDU is accepted by the server, the messaging service version becomes (X.Y), and the next version becomes (0.0). When the client wants to send a PDU second time, it is determined whether the next version is 0, if not, the PDU with the recorded next version (X.0) is sent. If the PDU is not accepted by the server, the messaging service version becomes (X.0), and the next version becomes (X−1.0). If the PDU is accepted by the server, the messaging service version becomes (X.0), and the next version becomes (0.0). When the client wants to send a PDU third time, it is determined whether the next version is 0, if not, the PDU with the recorded next version (X−1.0) is sent. If the PDU is not accepted by the server, the messaging service version becomes (X−1.0), and the next version becomes (X+1.0). If the PDU is accepted by the server, the messaging service version becomes (X−1.0), and the next version becomes (0.0).

If all possible versions have been selected (Yes in step S514), in step S520, the server identification and the default version (X.Y) are saved to the mapping table, and the last check time is updated. Similarly, if the server identification is already in the mapping table, the default version (X.Y) is updated to the field of an entry corresponding to the server identification, and the last check time is updated.

Figure 6:
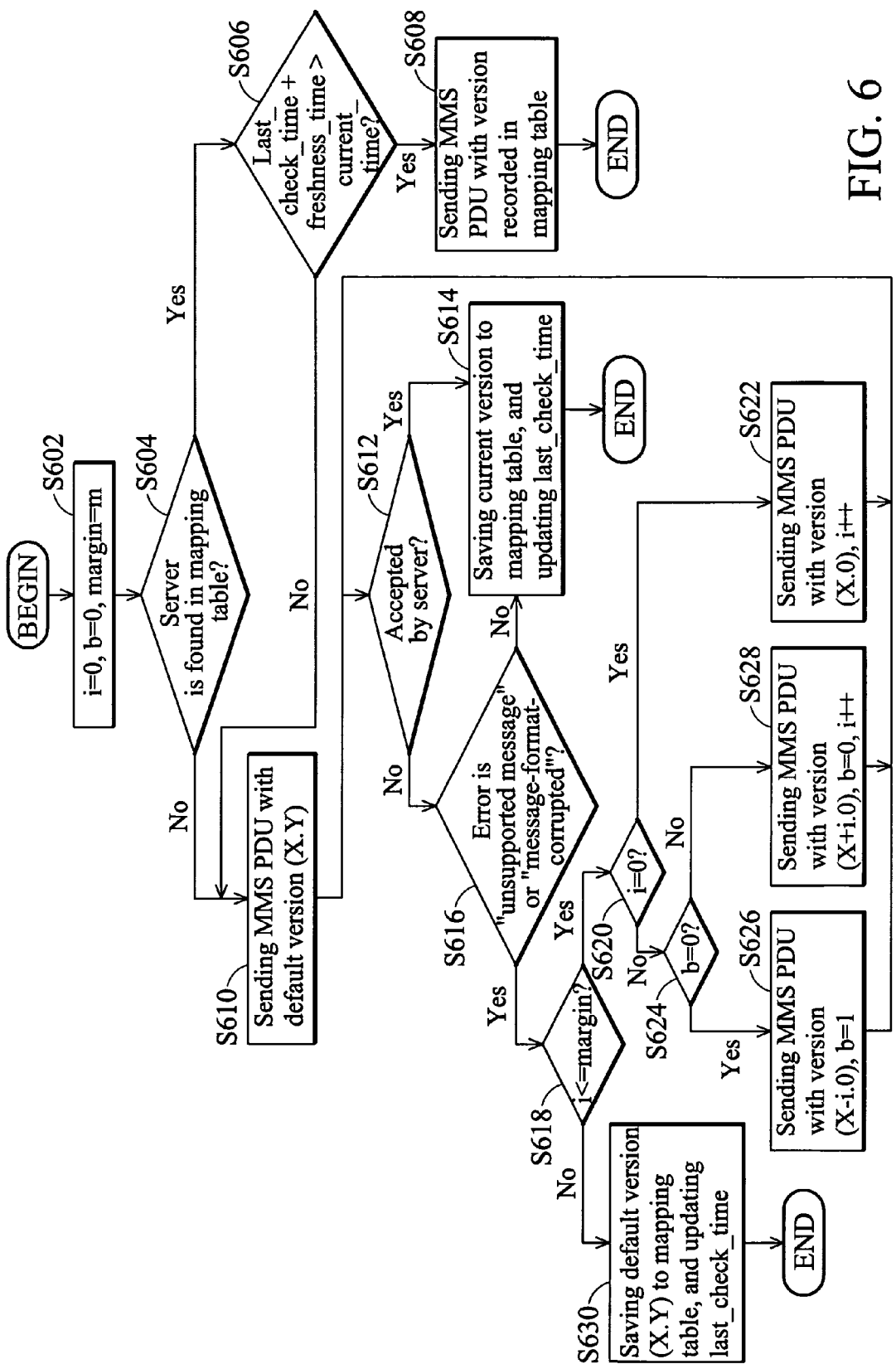
FIG. 6 is a flowchart of an embodiment of a MMS interoperability method.

FIG. 6 is a flowchart of an embodiment of a MMS interoperability method for use in a server, and a client implementing a MMS version (X.Y).

In step S602, related parameters are set, in which i=0, b=0, and version margin is set to m. In step S604, the client checks whether the server is recorded in the mapping table. If so, in step S606, it is determined whether the last check time corresponding to the server identification plus the freshness time exceeds a current time. If so, in step S608, the client sends a MMS PDU with the corresponding MMS version recorded in the mapping table to the server. If the server is not in the mapping table (No in step S604) or the last check time plus the freshness time does not exceed the current time (No in step S606), in step S610, the client sends a MMS PDU with the default MMS version (X.Y) to the server. In step S612, it is determined whether the MMS PDU is accepted by the server. If so, in step S614, the server identification and the current MMS version are saved to the mapping table, and the last check time is updated. It is understood that if the server identification is already in the mapping table, the current MMS version is updated to the field of an entry corresponding to the server identification, and the last check time is updated. If not, in step S616, it is determined whether an error indicating "unsupported-message" or "message-format-corrupted" is received from the server. If not, the procedure goes to step S614. If so, in step S618, it is determined whether i is equal to or less than version margin m. If so, in step S620, it is determined whether i equals 0. If so, in step S622, a MMS PDU with a MMS version (X.0) is sent to the server, and i is increased by 1. The procedure then goes to step S612. If i does not equal 0 (No in step S620), in step S624, it is determined whether b equals 0. If so, in step S626, a MMS PDU with a MMS version (X−i.0) is sent to the server, and b is set to 1. The procedure then goes to step S612. If not, in step S628, a MMS PDU with a MMS version (X+i.0) is sent to the server, b is set to 0, and i is increased by 1. The procedure then goes to step S612. If i is not equal to or less than version margin m (No in step S618), in step S630, the server identification and the default MMS version (X.Y) are saved to the mapping table, and the last check time is updated. In some embodiments, if the smallest major version number is 1 (that is the MMS version is (x−i.0)), (X−i) must be greater than or equal to 1. It is understood that if the server identification is already in the mapping table, the default MMS version is updated to the field of an entry corresponding to the server identification, and the last check time is updated. In this embodiment, the sequence of reselected MMS versions is (X.0), ((X−1).0), ((X+1).0), ((X−2).0), ((X+2).0), . . . , ((X−m).0), and ((X+m).0). In some embodiments, m is equal to 2.

Figure 7A:
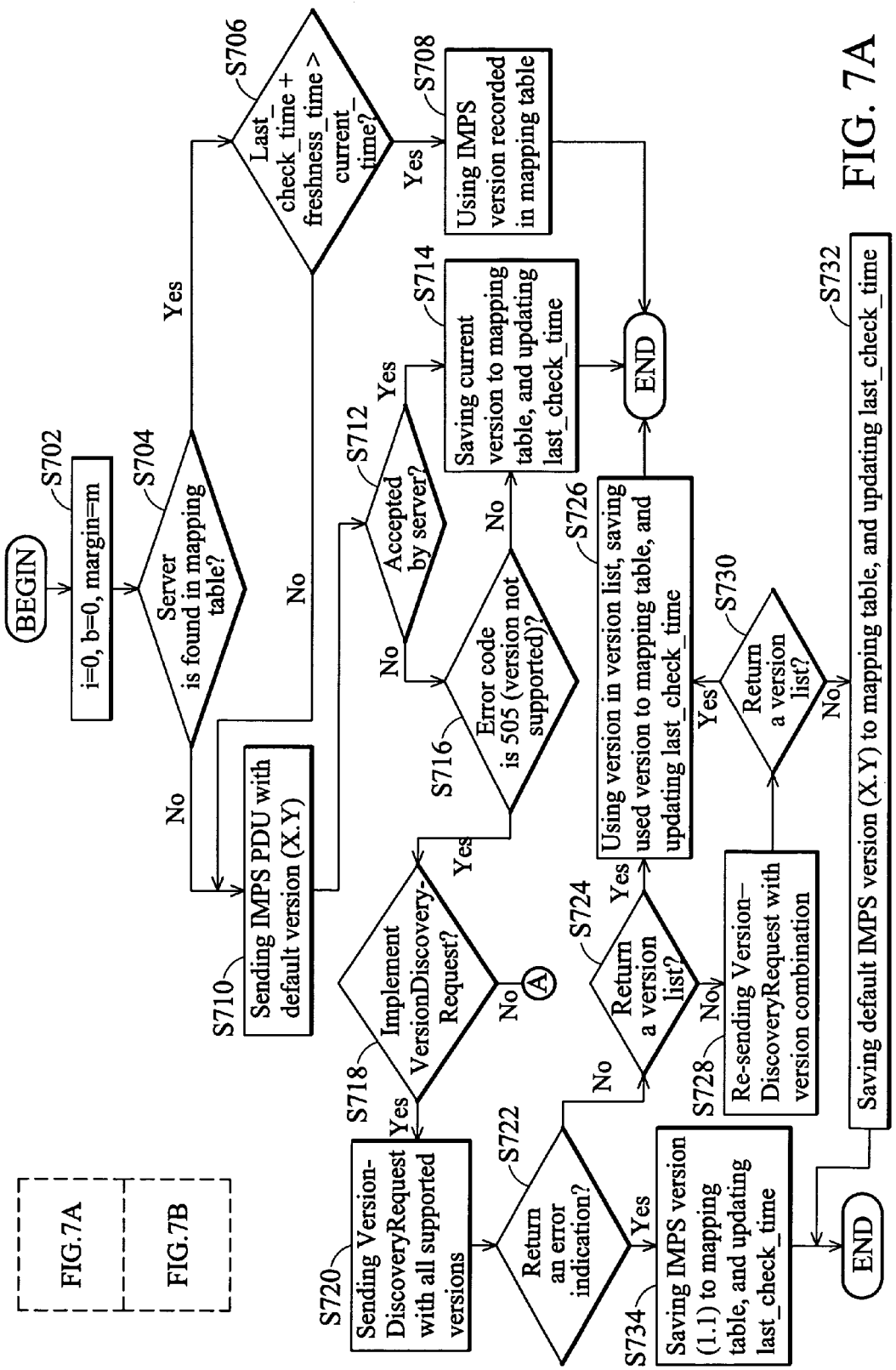
FIGS. 7A and 7B are flowcharts of an embodiment of an IMPS interoperability method.
Figure 7B:
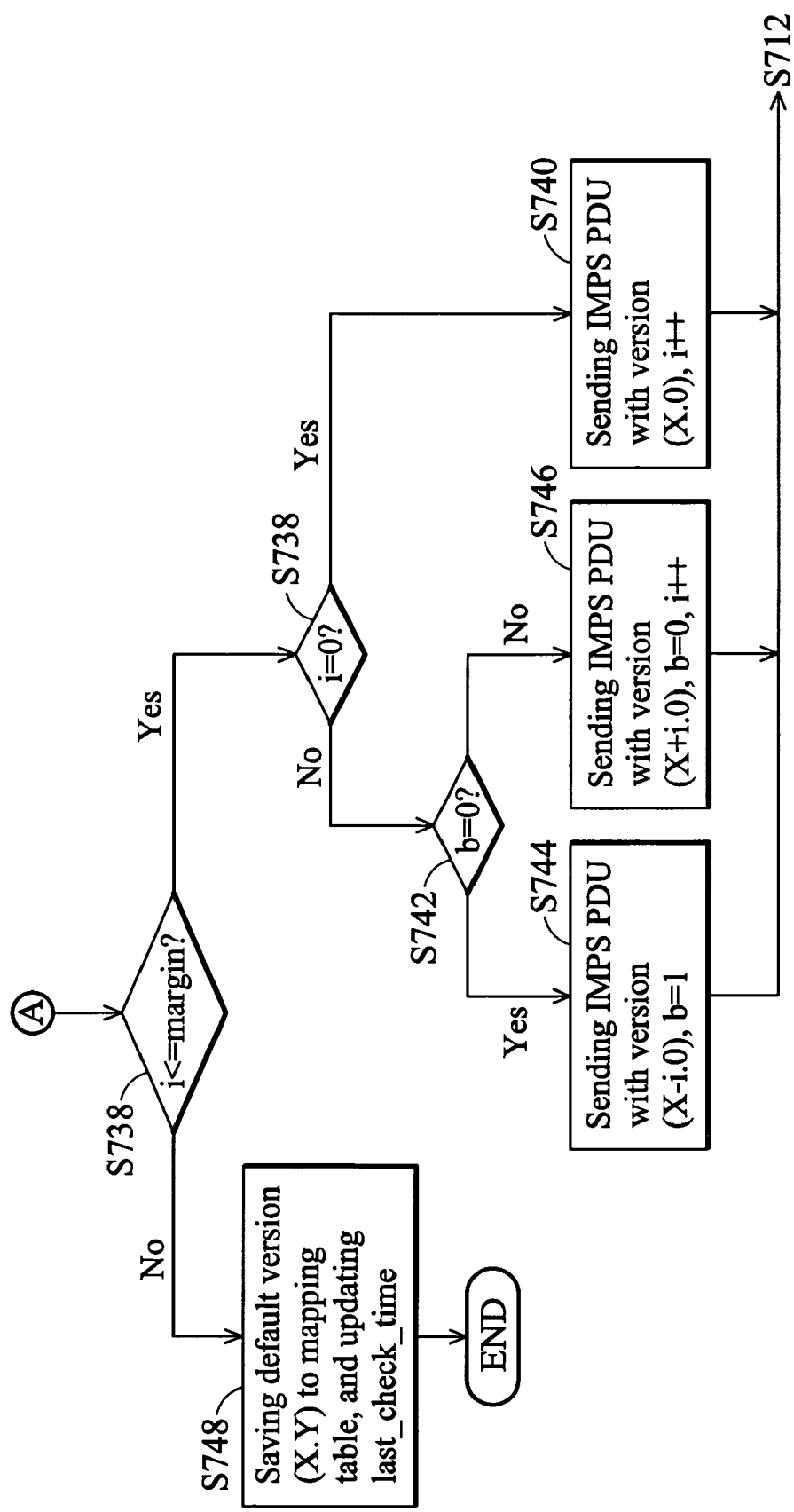

FIGS. 7A and 7B are flowcharts of an embodiment of an IMPS interoperability method for use in a server, and a client implementing an IMPS version (X.Y).

In step S702, related parameters are set, in which i=0, b=0, and version margin is set to m. In step S704, the client determines whether the server is recorded in the mapping table. If so, in step S706, it is determined whether the last check time corresponding to the server identification plus the freshness time exceeds a current time. If so, in step S708, the client uses the corresponding IMPS version recorded in the mapping table for further PDU transmission. If the server is not in the mapping table (No in step S704) or the last check time plus the freshness time does not exceed the current time (No in step S706), in step S710, the client sends an IMPS PDU with the default IMPS version (X.Y) to the server. In step S712, it is determined whether the IMPS PDU is accepted by the server. If so, in step S714, the server identification and the current IMPS version are saved to the mapping table, and the last check time is updated. It is understood that if the server identification is already in the mapping table, the current IMPS version is updated to the field of an entry corresponding to the server identification, and the last check time is updated.

If not, in step S716, it is determined whether an error code 505, indicating an IMPS version not supported, is received from the server. If not, the procedure goes to step S714. If so, in step S718, it is determined whether a function of version discovery request is implemented in the client. If so, in step S720, the client sends a version discovery request with all versions supported by the client to the server. In step S722, it is determined whether an error indication is returned from the server. If not, in step S724, it is determined whether a version list is returned from the server. If so, in step S726, the client uses an IMPS version recorded in the version list for further PDU transmission. Additionally, the server identification and the IMPS version are saved to the mapping table, and the last check time is updated.

If no version list is returned (No in step S724), in step S728, the client re-sends a version discovery request with version combination (X.0), ((X−1).0), ((X+1).0), ((X−2).0), ((X+2).0), . . . , ((X−m).0), and ((X+m).0) to the server. In some embodiments, m equals to 2. In step S730, it is determined whether a version list is returned from the server. If so, the procedure goes to step S726. If not, in step S732, the server identification and the default IMPS version (X.Y) are saved to the mapping table, and the last check time is updated. If an error indication is returned from the server (Yes in step S722), in step S734, the server identification and IMPS version (1.1) are saved to the mapping table, and the last check time is updated.

If the client does not implement the function of version discovery request (No in step S718), in step S736, it is determined whether i is equal to or less than version margin m. If so, in step S738, it is determined whether i equals 0. If so, in step S740, an IMPS PDU with an IMPS version (X.0) is sent to the server, and i is added by 1. The procedure then goes to step S712. If i does not equal 0 (No in step S738), in step S742, it is determined whether b equals 0. If so, in step S744, an IMPS PDU with an IMPS version (X−i.0) is sent to the server, and b is set to 1. The procedure then goes to step S712. If not, in step S746, an IMPS PDU with an IMPS version (X+i.0) is sent to the server, b is set to 0, and i is increased by 1. The procedure then goes to step S712. If i is not equal to or less than version margin m (No in step S736), in step S748, the server identification and the default IMPS version (X.Y) are saved to the mapping table, and the last check time is updated. In some embodiments, if the smallest major version number is 1 (that is the MMS version is (x−i.0)), (X−i) must be greater than or equal to 1. It is understood that if the server identification is already in the mapping table, the default IMPS version is updated to the field of an entry corresponding to the server identification, and the last check time is updated.

In these embodiments, the entries of the mapping table are increased and maintained. In some embodiments, the mapping table may be completely pre-installed, such that most servers and corresponding messaging service versions can be found therefrom. Thus, a client can directly retrieve a corresponding messaging service version according to server identification, and send PDUs with the retrieved version.

Messaging service interoperability methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A messaging service interoperability method for a client mobile device to implement a messaging service version (X.Y) to communicate with a server, in which X is a major version number and Y is a minor version number, comprising:
    sending a PDU (Protocol Data Unit) with version (X.Y) to the server;
    if the PDU with version (X.Y) is not accepted by the server, reselecting a messaging service version (Z.H) from a sequence of ((X.0), ((X−1).0), ((X+1).0), ((X−2).0), ((X+2).0), to ((X−m).0), and ((X+m).0)), in which m is a configurable margin, and sending a PDU with the reselected version (Z.H) to the server; and
    repeating reselection of the messaging service version and sending of a PDU with the reselected version until the PDU is accepted by the server or all possible reselected versions have been selected.

2. The method of claim 1 further comprising:
    determining whether the server is recorded in a mapping table before sending the PDU with version (X.Y) to the server, in which the mapping table comprises at least one entry recording an identification of the server and a specific messaging service version thereof;
    if so, retrieving the specific messaging service version; and
    sending a PDU with the specific messaging service version to the server.

3. The method of claim 2 further comprising:
    determining whether the specific messaging service version is valid by checking whether a last-check-time plus a freshness time exceeds a current time; and
    if so, retrieving the specific messaging service version.

4. The method of claim 1 further comprising if the PDU with version (Z.H) is accepted by the server, saving an identification of the server and the messaging service version (Z.H) to a mapping table, and setting a last-check-time to a current time.

5. The method of claim 1 further comprising if all the messaging service versions in the sequence are selected, saving an identification of the server and the messaging service version (X.Y) to a mapping table, and setting a last-check-time to a current time.

6. The method of claim 1 wherein the messaging service is MMS (Multimedia Messaging Service) or IMPS (Instant Messaging and Presence Service).

7. A messaging service interoperability method for a client mobile device to implement a messaging service version (X.Y) to communicate with a server, in which X is a major version number and Y is a minor version number, comprising:
    sending a PDU (Protocol Data Unit) with version (X.Y) to the server;
    if the PDU with version (X.Y) is not accepted by the server, sending a version discovery request with all versions supported by the client to the server;
    determining whether a version list is received from the server;
    if so, using a version in the version list as the messaging service version of the client; and
    if not, re-sending the version discovery request with one of versions (X.0), ((X−1).0), ((X+1).0), ((X−2).0), ((X+2).0) to ((X−m).0), and ((X−m).0) in sequence to the server, in which m is a configurable margin;
    using a version in the version list as the messaging service version of the client if the version list is received; and
    saving an identification of the server and the messaging service version (X.Y) to a mapping table, and setting a last-check-time to a current time if no version list is received.

8. The method of claim 7 further comprising saving the identification of the server and the version in the version list to the mapping table and setting the last-check-time to the current time if the version list is received due to the version discovery request with all versions supported by the client.

9. The method of claim 7 further comprising saving the identification of the server and the version in the version list to the mapping table; and setting the last-check-time to the current time if the version list is received due to the resent version discovery request.

10. The method of claim 7 further comprising:
    determining whether an error indication is returned from the server after sending the version discovery request with all versions supported by the client; and
    if so, saving the identification of the server and a messaging service version (1.1) to the mapping table, and setting the last-check-time to the current time.

11. The method of claim 7 further comprising:
    determining whether the server is recorded in the mapping table before sending the PDU with version (X.Y) to the server, in which the mapping table comprises at least one entry recording the identification of the server and a specific messaging service version thereon;
    if so, retrieving the specific messaging service version; and
    using the specific messaging service version as the messaging service version of the client.

12. The method of claim 11 further comprising:
    determining whether the specific messaging service version is valid by checking whether the last-check-time plus a freshness time exceeds the current time; and
    if so, retrieving the specific messaging service version.

13. The method of claim 7 wherein the messaging service is IMPS (Instant Messaging and Presence Services).

14. A device implementing a messaging service version (X.Y), in which X is a major version number and Y is a minor version number, comprising:
    means for sending a PDU (Protocol Data Unit) with version (X.Y) to a server;
    if the PDU with version (X.Y) is not accepted by the server, means for reselecting a messaging service version (Z.H) from a sequence of ((X.0), ((X−1).0), ((X+1).0), ((X−2).0), ((X+2).0) to ((X−m).0), and ((X+m).0)), in which m is a configurable margin, and means for sending a PDU with the reselected version (Z.H) to the server; and
    wherein reselection of the messaging service version and sending of a PDU with the reselected version are repeated until the PDU is accepted by the server or all possible reselected versions have been selected.

15. The device of claim 14 further comprising:
    means for determining whether the server is recorded in a mapping table before the PDU with version (X.Y) is sent to the server, in which the mapping table comprises at least one entry recording the identification of the server and a specific messaging service version thereon;

if present, means for retrieving the specific messaging service version and means for sending a PDU with the specific messaging service version to the server.

16. The device of claim 15 further comprising:

means for determining whether the specific messaging service version is valid by checking whether the last-check-time plus a freshness time exceeds the current time; and means for, if so, retrieving the specific messaging service version.

17. The device of claim 14 further comprising means for, if the PDU with version (Z.H) is accepted by the server, saving an identification of the server and the messaging service version (Z.H) to a mapping table and setting a last-check-time to a current time.

18. The device of claim 14 further comprising means for, if all the messaging service versions in the sequence are selected, saving an identification of the server and the messaging service version (X.Y) to a mapping table, and means for setting a last-check-time to a current time.

19. The device of claim 14 wherein the messaging service is MMS (Multimedia Messaging Service) or IMPS (Instant Messaging and Presence Services).

20. A device implementing a messaging service version (X.Y), in which X is a major version number and Y is a minor version number, comprising:

means for sending a PDU (Protocol Data Unit) with version (X.Y) to a server;

means for, if the PDU with version (X.Y) is not accepted by the server, sending a version discovery request with all versions supported by the client to the server;

means for determining whether a version list is received from the server; and means for, if so, using a version in the version list as the messaging service version of the client;

means for, if not, re-sending a version discovery request with one of versions (X.0), ((X−1).0), ((X+1).0), ((X−2).0), ((X+2).0)to ((X−m).0), and ((X+m).0) in sequence to the server, in which m is a configurable margin;

means for determining whether the version list is received from the server due to the resent version discovery request;

means for using the version in the version list as the messaging service version of the client if the version list is received due to the resent version discovery request;

means for saving an identification of the server and the messaging service version (X.Y) to a mapping table and setting a last-check-time to a current time if no version list is received due to the resent version discovery request.

21. The device of claim 20 further comprising:

means for, if the version list is received due to the version discovery request with all versions supported by the client, saving the identification of the server and the version in the version list to the mapping table and setting the last-check-time to the current time.

22. The device of claim 20 further comprising:

means for, if the version list is received due to the resent version discovery request, saving the identification of the server and the version in the version list to the mapping table and setting the last-check-time to the current time.

23. The device of claim 20 further comprising:

means for determining whether an error indication is returned from the server after the version discovery request with all versions supported by the client is sent; and means for, if so, saving the identification of the server and a messaging service version (1.1) to the mapping table, and setting the last-check-time to the current time.

24. The device of claim 20 further comprising:

means for determining whether the server is recorded in the mapping table before the PDU with version (X.Y) is sent to the server, in which the mapping table comprises at least one entry recording the identification of the server and a specific messaging service version thereon;

means for, if so, retrieving the specific messaging service version; and means for using the specific messaging service version as the messaging service version of the client.

25. The device of claim 24 further comprising:

means for determining whether the specific messaging service version is valid by checking whether the last-check-time plus a freshness time exceeds the current time; and means for, if so, retrieving the specific messaging service version.

26. The device of claim 20 wherein the messaging service is IMPS (Instant Messaging and Presence Services).

27. The method of claim 1, wherein the mapping table comprises a next_version field which is set to (0.0) if the PDU with version (X.Y) or (Z.H) is accepted by the server, and set to the next version in the sequence if the PDU with version (X.Y) or (Z.H) is not accepted by the server.

28. The device of claim 14, wherein the mapping table comprises a next_version field which is set to (0.0) if the PDU with version (X.Y) or (Z.H) is accepted by the server, and set to the next version in the sequence if the PDU with version (X.Y) or (Z.H) is not accepted by the server.

* * * * *